United States Patent
Holyoake et al.

(10) Patent No.: US 11,677,440 B2
(45) Date of Patent: Jun. 13, 2023

(54) POWER PATH IDENTIFICATION IN A POWER DISTRIBUTION SYSTEM

(71) Applicant: International Business Machines Corporation, Armonk, NY (US)

(72) Inventors: Colin Ian Holyoake, Braishfield (GB); Richard Postlethwaite, Wiltshire (GB); Simon Salter, Winchester (GB)

(73) Assignee: International Business Machines Corporation, Armonk, NY (US)

(*) Notice: Subject to any disclaimer, the term of this patent is extended or adjusted under 35 U.S.C. 154(b) by 424 days.

(21) Appl. No.: 16/568,508

(22) Filed: Sep. 12, 2019

(65) Prior Publication Data
US 2021/0083722 A1 Mar. 18, 2021

(51) Int. Cl.
- G05D 3/12 (2006.01)
- H04B 3/54 (2006.01)
- G05B 15/02 (2006.01)
- H02J 3/00 (2006.01)

(52) U.S. Cl.
CPC ............ H04B 3/542 (2013.01); G05B 15/02 (2013.01); H04B 3/548 (2013.01); H02J 3/00 (2013.01)

(58) Field of Classification Search
CPC .................................................. H04B 3/542
USPC ........................................................ 717/286
See application file for complete search history.

(56) References Cited

U.S. PATENT DOCUMENTS

| | | | |
|---|---|---|---|
| 6,933,835 B2 | 8/2005 | Kline | |
| 7,917,792 B2* | 3/2011 | Brech | G06F 11/30 713/340 |
| 9,122,471 B2 | 9/2015 | Henise, IV | |
| 9,329,654 B2 | 5/2016 | Hutten | |
| 10,326,284 B2* | 6/2019 | Long | H02J 7/0013 |
| 10,812,339 B2* | 10/2020 | Marinelli | G06F 11/3006 |
| 11,038,373 B2* | 6/2021 | Yamamoto | H02J 50/10 |
| 2015/0097574 A1* | 4/2015 | Kashiwagi | G01R 19/2513 324/537 |
| 2016/0013988 A1 | 1/2016 | Andrews | |
| 2016/0334860 A1 | 11/2016 | Palmer | |
| 2019/0166508 A1* | 5/2019 | Friday | H04W 4/021 |
| 2022/0004214 A1* | 1/2022 | Forbes, Jr. | H02J 3/322 |

FOREIGN PATENT DOCUMENTS

RU 2008138801 A * 4/2010

* cited by examiner

*Primary Examiner* — Evral E Bodden
(74) *Attorney, Agent, or Firm* — Edward J. Wixted, III (57) ABSTRACT

Method and system are provided for power path identification in a power distribution system. The method transmits a data signal through a power line infrastructure including adding an identifier value at multiple points of the infrastructure to the data signal to form a concatenated path identifier formed of the identifier values. The method reads the path identifier at a reading point of the infrastructure to obtain power path information to or from the reading point in the power line infrastructure. A system may include a plurality of path identification devices each provided at a connection point of the power distribution system to transmit connection point identifiers to form a concatenated path identifier with identifier values of other connection points.

18 Claims, 6 Drawing Sheets

POWER PATH IDENTIFICATION IN A POWER DISTRIBUTION SYSTEM

BACKGROUND

The present invention relates to power path identification in a power distribution system, and more specifically, to identification of a power path from an input point to an end point in a power distribution system.

In a datacenter environment it is essential that different routes are used for feeding power to a server device in order to provide an alternative power source if there is a failure. If there is any common link in a power distribution path, this results in a risk of a single point of failure that will remove the backup power source route.

As an example, a server may be holding a critical web server. It has two power supplies so that it will automatically failover from one power supply to the other in the event of a problem. It is therefore ideal for the server to be plugged into separate power poles within its hosting rack. From this point, the power poles themselves should be plugged into different distribution boards to again reduce any single point of failure. Continuing this trend, the distributions should be fed from separate feeds from a low voltage board that are fed from separate feeds from a high voltage board, which ultimately should be fed from two feeds to the site.

A fuse number may be provided at an end point in the form of a power distribution path such as: DC1/S2/A/L3/2. This identifies it as travelling through a route via a distribution DC1, satellite distribution S2, module A, phase 3, fuse number 2.

SUMMARY

According to an aspect of the present invention there is provided a method for power path identification in a power distribution system comprising: transmitting a data signal through a power line infrastructure including adding an identifier value at multiple points of the infrastructure to the data signal to form a concatenated path identifier formed of the identifier values; and reading the path identifier at a reading point of the infrastructure to obtain power path information from the reading point in the power line infrastructure.

According to another aspect of the present invention there is provided a path identification device for power path identification, the device configured to be provided at a connection point in a power distribution system comprising: a data over power communication module for data signal transmission in a power line at the connection point using a predefined frequency and for data signal reading from the power line at the connection point; a path identifier adding component for providing an identifier value to the data over power communication module for transmission at the connection point; and a path identifier reading component for receiving a read data signal from the data over power communication module of a path identifier at the connection point of the infrastructure, wherein the path identifier is formed of concatenated identifier values of multiple connection points on a path of the power line to or from the connection point.

According to an aspect of the present invention there is provided a system for power path identification in a power distribution system, comprising: a plurality of path identification devices each provided at a connection point of the power distribution system and configured to: transmit a data signal through a power line infrastructure including adding an identifier value of the connection point to the data signal to form a concatenated path identifier with identifier values of other connection points; and read the path identifier at the connection point of the infrastructure to obtain power path information to or from the connection point in the power line infrastructure.

DETAILED DESCRIPTION

Embodiments of the present invention recognize that at every point there should be a circuit labelled up, fuse sheets recorded, etc., which may introduce human error for every circuit. Human errors may occur in the form of: fuse sheets incorrectly written; fuse sheets not updated; labeling being incorrectly created with typographical errors; etc. Labeling may also become unattached from racks, commando sockets, and cabling. This may occur due to air conditioning affecting the adhesive. Furthermore, if a cable is relocated, all points of labeling of a rack require updating.

The described system relates to automatic labelling of points in an electrical power distribution system, such as of a datacenter, by providing a power path identifier that is transmitted as a data signal through a power line infrastructure and identifies a power infrastructure path. Identifier values at each point of the infrastructure are added to the power path identifier as the power line passes through the point of the infrastructure path. This may be used as an active labeling for the physical supplying infrastructure.

This may result in a source power path identifier received at an end supply point formed of a concatenation of identifier values of each point of the infrastructure path from a source point to the supply point. A source power path identifier is received downstream and identifies all points along the power path from the source.

This may also result in a destination path identifier received at a source point of all supply points fed by the source point. A destination path identifier is received upstream and identifies all points fed by from the source point, for example, as a tree model.

Power path identification data signals may be transmitted and received at points along the power line infrastructure. An intermediate point in the power line infrastructure may receive a power path identification data signal, add its identifier value to the path, and transmit the new power path identification data signal up and/or down the power line.

The system may also provide a display for reading the path identifier at an end point and selected points along the path of the power line infrastructure.

Figure 1:
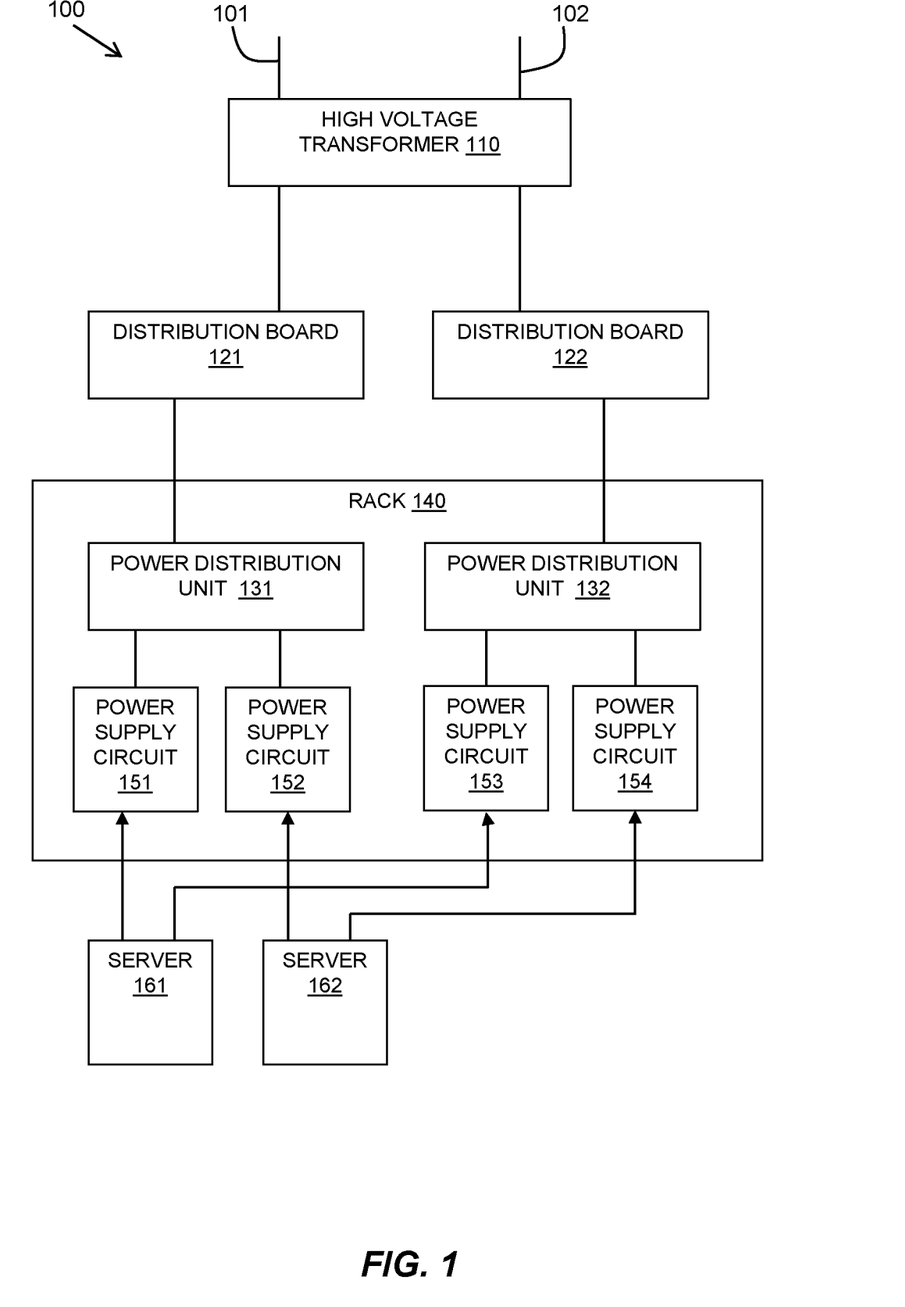
FIG. 1 is a schematic diagram of a power distribution system in which the present invention may be implemented.

Referring to FIG. 1, a schematic diagram shows an example embodiment of a power redundancy system 100 in a datacenter in which the described method and system may be implemented. The shown power redundancy system 100 is a simplified illustration to show two redundant power paths to an end power-consuming device. This is shown in the example scenario of a datacenter; however, there are a large number of power supply environments which have multiple power paths for redundancy to which the described method and system may be applied.

The power redundancy system 100 may be fed by one or more site power feeds 101 and 102 from a power substation, and the site power feeds 101 and 102 may be received at a high voltage transformer 110. The high voltage transformer 110 feeds low voltage distribution boards 121, 122, which in turn feed multiple power distribution units 131, 132 for each or part of a server rack 140. Each power distribution unit 131, 132 may have multiple power supply circuits 151, 152, 153, 154, for example, provided as power poles of a server rack 140 housing power supply sockets into which a server 161, 162 may be plugged.

Each of the branch points of a power distribution system from one or more sources to the outputs is referred to herein as a "connection point". Fuses may be provided at connection points of the power supply to limit the power drawn from different points by a next branch or by an end use.

The described method and system provide a path identification device at some or each of the connection points in a power path in a power distribution system such as that described in FIG. 1. In addition, path identification devices may be provided between branch points if required. The path identification devices provide the described path identification by transmitting and receiving a path identification data signal into and from the power line of the power line infrastructure. The path identification devices may be provided as part of an automated building management system or may be provided as stand-alone components that may have a local display or may transmit data for remote display.

Figure 2:
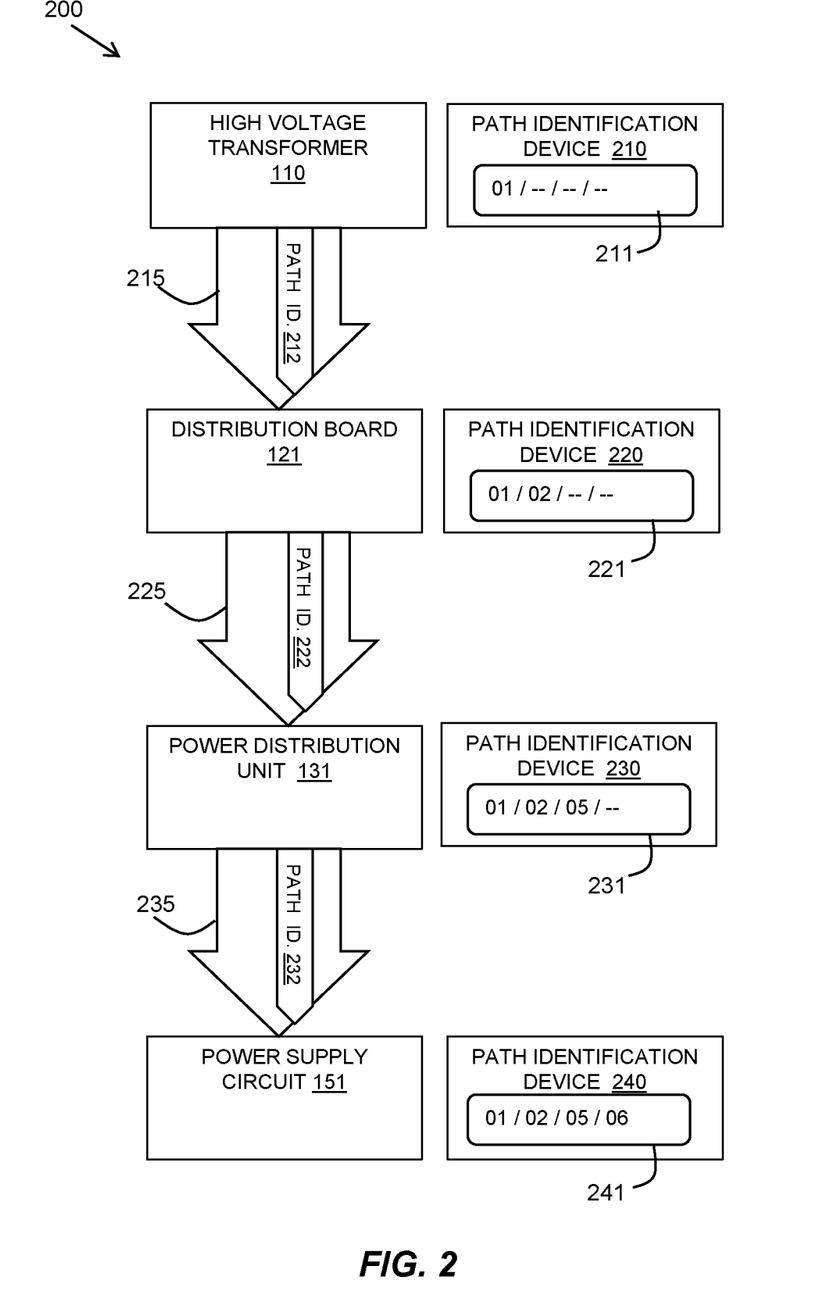
FIG. 2 is a schematic diagram of a method of path identification using multiple path identification devices, in accordance with the present invention.

Referring to FIG. 2, a schematic diagram 200 shows an example embodiment of the input of a signal at connection points in a power supply path in a power distribution system.

The connection points in the power supply path of this example are taken from the power distribution system of FIG. 1 and are the high voltage transformer 110, distribution board 121, power distribution unit 131, and power supply circuit 151. The power supply path 215, 225, 235 is shown as a series of block arrows between the connection points. The power supply path may pass through the connection points or may be formed of connected wires at the connection points.

The described method and system provide a data signal 212, 222, 232 which is propagated through the power supply path 215, 225, 235 using known techniques of transmitting data over a power line. The data signal 212, 222, 232 provides a path identification of the route of the power supply through the power distribution system.

At each connection point, a path identification device 210, 220, 230, 240 is provided that reads an incoming path identifier, if available, adds an identifier value representing the connection point to the read path identifier or starts a path identifier, and transmits the new path identifier 211, 221, 231 to the next connection point as the data signal 212, 222, 232 in the power line. The format of the path identifier may vary according to prescribed configurations for ease of interpretation of the path identifier and, in this example, a simple two-digit value is used to identify each connection point.

In FIG. 2 a source path identifier is illustrated as being built up as the power line goes from a source in the form of a high voltage transformer 110 to a destination in the form of a power supply circuit 151. The path identification device 210 at the high voltage transformer 110 may start the path identifier 211 by adding the two-digits "01" identifying the high voltage transformer 110. This is transmitted as a data signal 212 in the power line to the next downstream connection point of a distribution board 121.

The path identification device 220 at the distribution board 121 may read the path identifier 211 of the incoming data signal 212 and may add the two-digits "02" identifying the distribution board 121. This results in a path identifier 221 of "01/02" that is transmitted as a data signal 222 in the power line to the next downstream connection point of a power distribution unit 131.

The path identification device 230 at power distribution unit 131 may read the path identifier 221 of the incoming data signal 222 and may add the two-digits "05" identifying the power distribution unit 131. This results in a path identifier 231 of "01/02/05" that is transmitted as a data signal 232 in the power line to the next downstream connection point of a power supply circuit 151.

The path identification device 240 at the power supply circuit 151 may read the path identifier 231 of the incoming data signal 232 and may add the two-digits "06" identifying the power supply circuit 151. This results in a path identifier 241 of "01/02/05/06" that gives the full source path identifier from the power source to that specific power supply circuit 151. This illustrates the transmittal of the source path identifier from the power source to a power supply circuit 151. At any point in the power line, the path identifier may be read and displayed.

Additionally, the path identification device 240 at the power supply circuit 151 may transmit a supply identifier value back through the power line 235, 225, for example, to a distribution board 121 in order for a path identification device 220 at the distribution board 121 to read the destination path identifiers of supply identifiers to plot power distribution.

This return path identification data signal may be used to provide and display a tree model of all nodes supplied from a distribution board 121 providing a destination path identifier. At each connection point, for example at the power distribution unit 131, received signals received from all downstream power supply circuits 151 may be concatenated with the identifier value of the power distribution unit 131 for sending upstream to the high voltage transformer 110.

This may result in an example tree model return identification path of the form "DB1/DU1/PS1/PS2/PS3/DU2/PS4/PS5/PS6", where distribution board DB1, feeds distribution two units DU1, DU2, with the first distribution unit DU1 feeding power supply circuits PS1, PS2, PS3 and the second distribution unit DU2 feeding power supply circuits PS4, PS5 and PS6. A tree model of supplied points provides an indication of any end supply points that are not receiving power supply as their identifier will be missing from the path.

Figure 3:
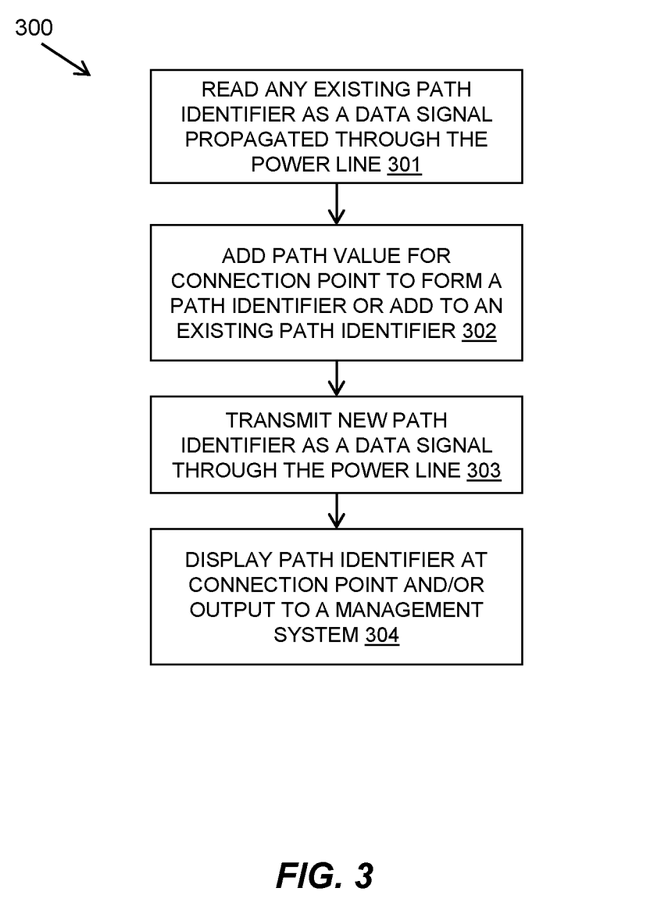
FIG. 3 is flow diagram of an example embodiment of a method carried out at a path identification device, in accordance with the present invention.

Referring to FIG. 3, a flow diagram 300 shows an example embodiment of a method carried out at a path identification device 210, 220, 230, 240 for a path identifier to be sent and received between a power source and supply points. The method may be carried out to create the path identifier as the path is created. An interrupt may break the circuit and potentially show less path detail, then the path identifier may be re-established when the signal is restored. In some example embodiments, the path identifier may only be sent downstream from a power source point to power supply points, or upstream from power supply points to a power source point.

A path identification device at any point along the power supply path may read 301 an incoming data signal in the power line for any existing path identifier. The existing path identifier may be received from either direction of input power or output power at an intermediate point in a power line supply in the form of a source power path identifier or a destination path identifier. If the path identification device 210 is at a source of the power in a power distribution system, there may be no existing source path identifier as a data signal as this is the start of the path. If the path identification device 210 is at a supply point in the power distribution system, there may be no existing destination path identifier as a data signal is at the destination point.

The path identification device may add 302 a path value representing its connection point to either create a path identifier or to add to an existing read path identifier. The new path identifier may be transmitted 303 as a data signal through the power line.

The path identifier at a connection point may be displayed so that it can be read and displayed at the connection point and/or may be output 304 to a management system that controls the connection points of the power distribution system.

This method adds an identifier value to the path identifier as the infrastructure handles the power in order to build up a parent/child relationship from internal points within an infrastructure as the circuits are known. The path identifier may be built up as the as the signal is passed through the connection points at a time of first power connections.

In one embodiment of a described source path identifier, there may be a configuration whereby a fixed connection point, such as a transformer, should append only to the first 2 octets of the hardware address (for example, 01), a distribution unit should append only the second pair of octets (02), and so on. If there is no module present at a connection point, the designated octets should be left blank. A fuse location may only update a 4th pair of octets (06) and therefore an output would be presented as 01/02/-/06.

In another embodiment, the different types of connection point may have an identifying letter, for example, T=for transformer, M=Module, F=Fuse and a corresponding value.

The source path identifier at a supply point is therefore a hardware address for the path the electricity is supplied from within the datacenter environment. A user can be confident that a label generated from the source path identifier for a fuse, a rack, or cabling is automatically accurate.

A server may be plugged into a power supply circuit and a source path identifier may be read at the power supply circuit indicating the power supply path. If the server is moved to another power supply circuit, the new source path identifier can be read from the source to the end point.

A path identification device at a downstream connection point may also transmit a destination path identifier back up the power line for supply mapping.

This provides a method for two-way path address communication, which allows not just the end element to know the full address path but to feedback its own address so that the upper elements can see the addresses of all elements downstream.

Figure 4:
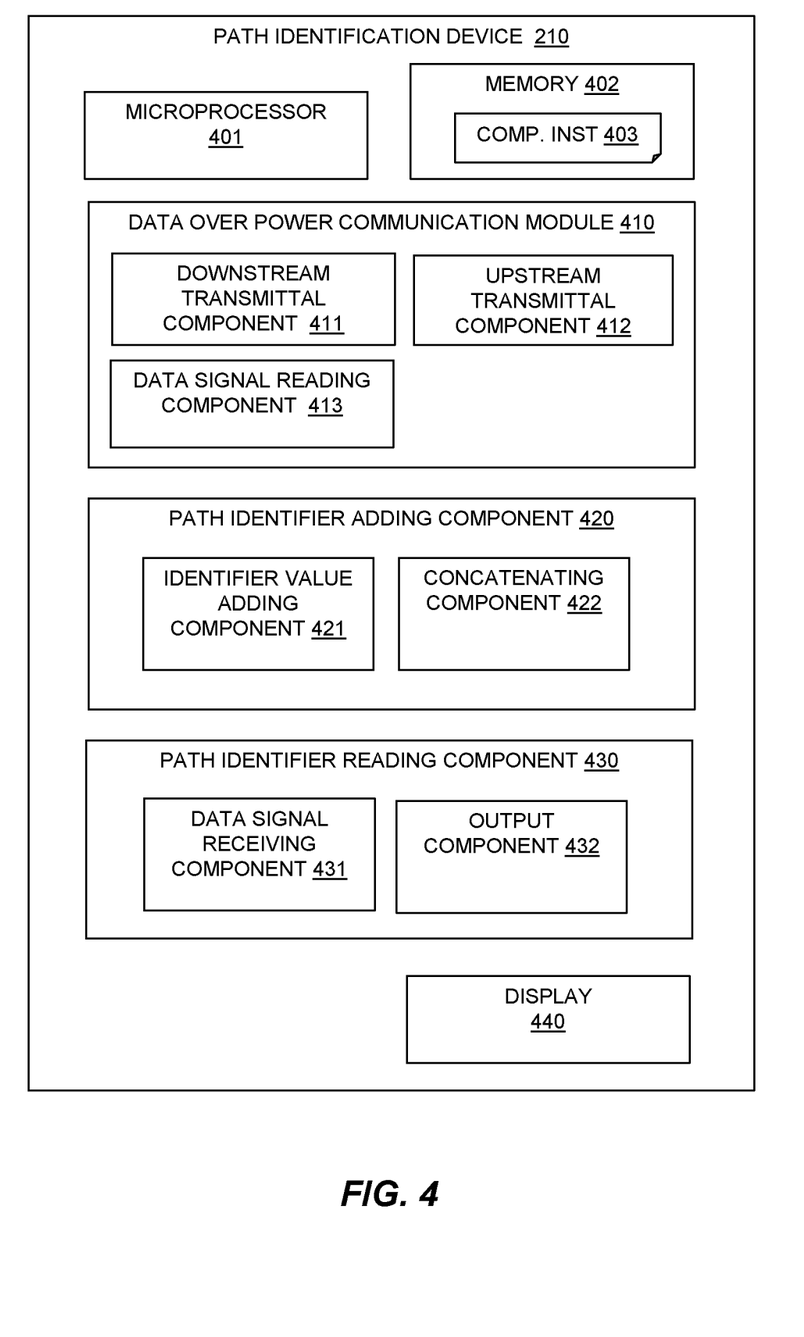
FIG. 4 is a block diagram of an example embodiment of a path identification device, in accordance with the present invention.

FIG. 4 shows an example embodiment of a path identification device 210. A path identification device 210 is a data signal reader and input module that may be provided at a connection point in a power distribution system or at an intermediate point on a power line.

The path identification device 210 uses known technologies for reading and inputting a data signal in an electricity supply power line. Such known technologies include data over power communication systems such as power line communication and X10 industry standard protocol for communication among electronic devices. The path identification device 210 includes a data over power communication module 410 data signal transmission in a power line at the connection point using a predefined frequency and for data signal reading from the power line at the connection point. The data over power communication module 410 may use known the technology to couple to the power line, for example, by capacitive coupling, and transmit and read the data signal to and from the power line.

Data over power communications systems operate by adding a modulated carrier signal to a power wiring system. Different types of data over power communications use different frequency bands, typically 60 Hz or more as power is typically set to frequencies of 50-60 Hz. The data is injected into the power line at a frequency that does not affect standard electricity. It is sent over the power line in a data packet including a payload of data that the modules in the described system can edit and read.

X10 protocol uses power line wiring for signaling and conventionally for control of electronic devices. The signals involve brief radio frequency bursts representing digital information. Signal packets are transmitted formed of a start code, followed by a house code, followed by unit codes, followed by commands X10 devices may include two-way signal propagation for sending commands and acknowledging their status. The X10 protocol may be adapted to send a path identifier as a data signal in one-way or two-way communication along a power line in accordance with the described methods.

The data over power communication module 410 may include a downstream transmittal component 411 for transmitting the data signal downstream to a supply point of the power line, so that a source path identifier includes concatenated identifier values from a power line source. The data over power communication module 410 may also include an upstream transmittal component for transmitting the data signal upstream to a source point of the power line, so that a destination path identifier includes concatenated identifier values from a power line end supply point.

The data over power communication module 410 also includes a data signal reading component 413 for reading a data signal received from upstream or downstream points in the power line.

The path identification device 210 may include a microprocessor 401, a hardware module, or a circuit for executing the functions of the described components which may be software units executing on the microprocessor 401. Memory 402 may be configured to provide computer instructions 403 to the at least one microprocessor 401 to carry out the functionality of the components.

The path identification device 210 may include a path identifier adding component 420 for providing an identifier value to the data over power communication module 410 for transmission by either or both of the downstream transmittal component 411 and the upstream transmittal component 412. The path identifier adding component 420 includes an identifier value adding component 421 for adding a value identifier of the connection point using a concatenating component 422 to concatenate it to a read path identifier read at the connection point as obtained from the data signal reading component 413 of the data over power communication module 410.

The path identification device 210 may include a path identifier reading component 430 including a data signal receiving component 431 for receiving a read data signal from the data signal reading component 413 of the data over power communication module 410 of a path identifier at the connection point. The path identifier reading component 430 may also include an output component 432 to output the read path identifier to a display 440 at the path identification device 210 and/or to a remote management system.

The display 440 may be, for example, an electric ink or liquid crystal display, presenting the source and/or destination path identifiers. To prevent loss of a path identifier, a charged capacitor may be provided by the display 440 to store the information if power is lost.

The display 440 for the path identifier at a given connection point may use a display installed in an apparatus of the power distribution system, such as at a power pole and/or a distribution unit.

Most modern power distribution systems have metering and intelligence built into them typically used for a building management systems (BMS).

Figure 5:
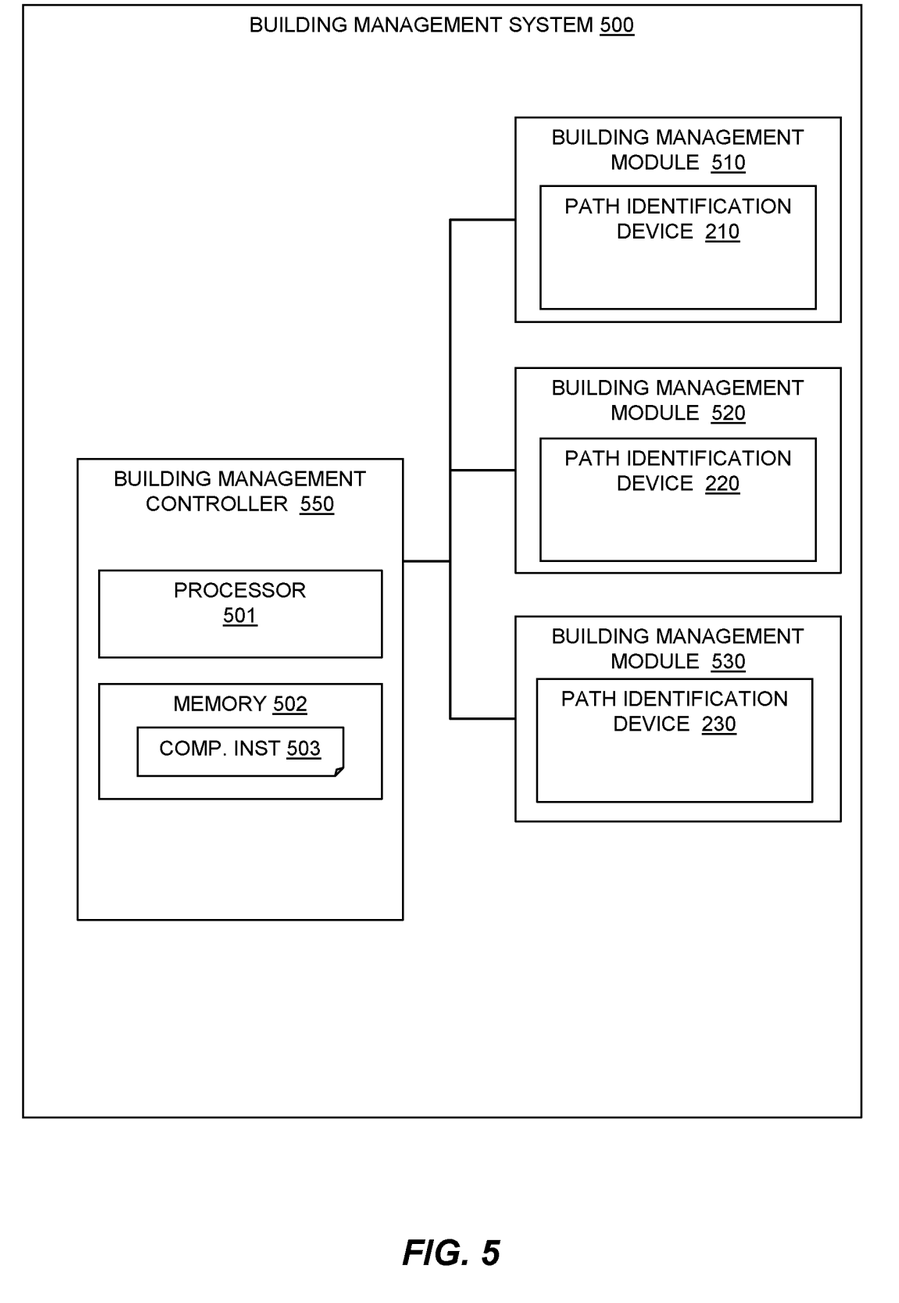
FIG. 5 is a block diagram of a building management system in which a system according to the present invention may be implemented.

Referring to FIG. 5, a schematic diagram of an example BMS 500 is shown that may be provided in a datacenter. The BMS 500 may have a building manager controller 550 that includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The building manager controller 550 may receive management information from multiple building management modules 510, 520, 530 provided at different parts of the physical infrastructure of the datacenter. For example, a building management module 510 may be provided at the high voltage transformer 110, a building management module 520 may be provided at a distribution board 121, and a building management module 530 may be provided at a power distribution unit 131.

The addition of path identification devices 210, 220, 230, 240 with a data over power communication equivalent module to read and input the path identifiers may be added to the building management modules 510, 520, 530 as part of the physical infrastructure of the BMS.

As an example, a datacenter rack may contain power pole units that do the final power provision to multiple servers. These units can be intelligent whereby instructions can remotely power the sockets down, connect them to a network, or pull statistics from them using a BMS 500.

In a similar concept to the path address being sent from distribution to the supply points at a power pole in a rack, the supply points in a power pole in a rack may send an identifier back to a distribution unit, such as if a datacenter manager configures a rack identifier. As the datacenter distribution units have a BMS 500, this may then be used to plot out rack to circuit identifiers.

Figure 6:
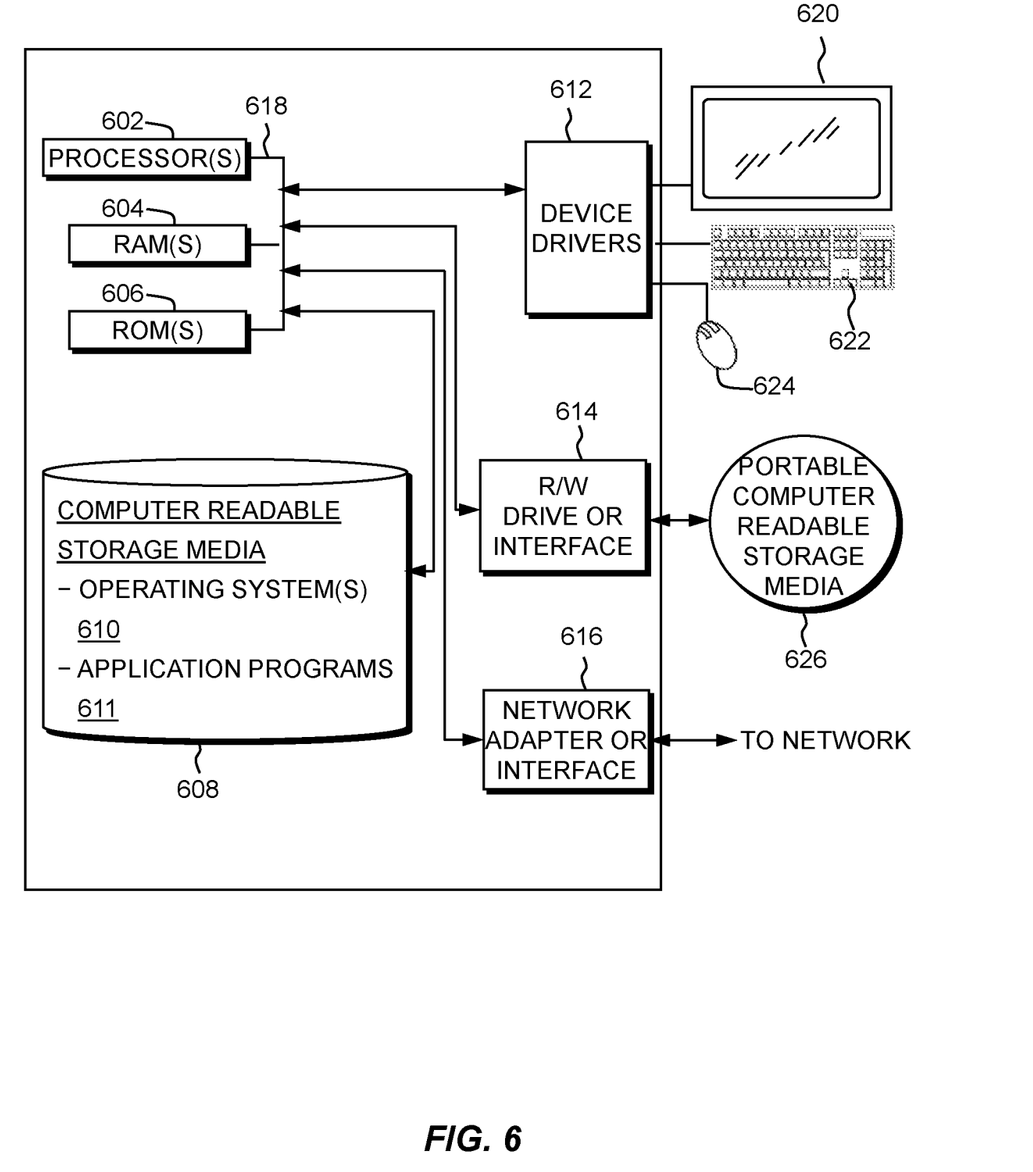
FIG. 6 is a block diagram of an embodiment of a computer system in which the present invention may be implemented.

FIG. 6 depicts a block diagram of components of a computing device, such as that of the path identification devices 210, 220, 230, 240 or the building management controller 550 or building management modules 510, 520, 530 in accordance with embodiments of the present invention. It should be appreciated that FIG. 6 provides only an illustration of one implementation and does not imply any limitations with regard to the environments in which different embodiments may be implemented. Many modifications to the depicted environment may be made.

Computing device can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611 are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, a portable compact disc read-only memory (CD-ROM), a digital versatile disk (DVD), memory stick, magnetic tape, magnetic disk, optical disk, a semiconductor storage device such as a random access memory (RAM), a read-only memory (ROM), an erasable programmable read-only memory (EPROM), flash memory, or any other computer readable storage media that can store a computer program and digital information, in accordance with embodiments of the invention.

High voltage transformer 110 can also include a R/W drive or interface 614 to read from and write to one or more portable computer readable storage media 626. Application programs 611 on high voltage transformer 110 can be stored on one or more of the portable computer readable storage media 626, read via the respective R/W drive or interface 614 and loaded into the respective computer readable storage media 608.

High voltage transformer 110 can also include a network adapter or interface 616, such as a TCP/IP adapter card or wireless communication adapter. Application programs 611 on high voltage transformer 110 can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

High voltage transformer 110 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for power path identification in a power distribution system, the method comprising:
   transmitting a data signal through a power line infrastructure, including a power line, wherein:
      transmitting the data signal includes adding an identifier value at multiple points of the power line infrastructure to the data signal to form a concatenated path identifier formed of the identifier values; and
      each respective identifier value includes an identifying letter representing a type of connection point in the power line infrastructure, the power line infrastructure including a plurality of connection points of different types;
   reading the path identifier at a reading point of the infrastructure to obtain power path information from the reading point in the power line infrastructure; and
   transmitting the path identifier upstream, through the power line, to a source point of the power line infrastructure.

2. The method as claimed in claim 1, wherein transmitting the data signal through the power line infrastructure transmits the data signal downstream to a supply point of the power line, and the path identifier includes concatenated identifier values from a power line source.

3. The method as claimed in claim 1, wherein transmitting the data signal through the power line infrastructure transmits the data signal upstream to the source point of the power line, and the path identifier includes identifier values from one or more power line end supply points.

4. The method as claimed in claim 3, wherein the path identifier including values from more than one power line end supply point is in the form of a tree model branching from the more than one power line end supply point.

5. The method as claimed in claim 1, wherein adding an identifier value at one of the multiple points includes:
   reading a path identifier at the point;
   adding a value identifier of the point to concatenate it to the path identifier; and
   transmitting the concatenated path identifier.

6. The method as claimed in claim 1, wherein adding the identifier value at multiple points of the infrastructure to the data signal is carried out when a power line is first connected after an interruption at a connection point.

7. A path identification device for power path identification, the device configured to be provided at a connection point in a power distribution system comprising:
   a data over power communication module including one or more computer processors that perform data signal transmission in a power line at the connection point using a predefined frequency and for data signal reading from the power line at the connection point;
   a path identifier adding component including one or more computer processors that provide an identifier value to the data over power communication module for transmission at the connection point, wherein each respective identifier value includes an identifying letter representing a type of connection point in the power line, the power line including a plurality of connection points of different types;
   a path identifier reading component including one or more computer processors that receive a read data signal from the data over power communication module of a path identifier at the connection point of an infrastructure, wherein the path identifier is formed of concatenated identifier values of multiple connection points on a path of the power line connecting to the connection point; and
   an upstream transmittal component including one or more processors that transmits the path identifier, through the power line, to a source point.

8. The path identification device as claimed in claim 7, wherein the data over power communication module includes a downstream transmittal component including one or more computer processors that transmit the data signal downstream to a supply point of the power line, and the path identifier includes concatenated identifier values from a power line source.

9. The path identification device as claimed in claim 7, wherein the path identifier adding component adds a value identifier of the connection point to concatenate it to a read path identifier read at the connection point by the path identifier reading component.

10. The path identification device as claimed in claim 7, including a display device for displaying the path identifier from the reading component at the connection point.

11. The path identification device as claimed in claim 7, including an output component for outputting the path identifier from the reading component to a remote management system.

12. The path identification device as claimed in claim 7, wherein the path identification device is integrated into a building management system device at a connection point.

13. A system for power path identification in a power distribution system, the system comprising:
   a plurality of path identification devices each provided at a connection point of the power distribution system and having one or more computer processors configured to:
      transmit a data signal through a power line infrastructure, including a power line, wherein:
         transmitting the data signal includes adding an identifier value at multiple points of the power line infrastructure to the data signal to form a concatenated path identifier formed of the identifier values; and
         each respective identifier value includes an identifying letter representing a type of connection point in the power line infrastructure, the power line infrastructure including a plurality of connection points of different types; read the path identifier at the connection point of the infrastructure to obtain power path information to or from the connection point in the power line infrastructure; and
      transmit the path identifier upstream, through the power line, to a source point of the power line infrastructure.

14. The system as claimed in claim 13, wherein a path identification device is configured to read the path identifier at the connection point of a path identifier including concatenated identifier values from a power line source transmitted downstream to the connection point.

15. The system as claimed in claim 13, wherein a path identification device is configured to read the path identifier at the connection point of a path identifier including concatenated identifier values from a power line supply transmitted upstream to the connection point.

16. The system as claimed in claim 13, wherein the system is integrated into a building management system including a building management controller including a processor and a memory configured to provide computer program instructions to the processor to execute function to manage the building management system.

17. The method of claim 1, wherein the letter representing the type of connection point in the power line infrastructure corresponds to a type of connection point selected from the group consisting of transformer, module, and fuse.

18. The method of claim 1, wherein subsequent to no module being present at a connection point in the power line infrastructure, causing designated octets, of the path identifier, associated with the connection point to remain blank.

* * * * *